US010764304B2

(12) United States Patent
Zhang (10) Patent No.: US 10,764,304 B2
(45) Date of Patent: Sep. 1, 2020

(54) USER LOCATION CHECK METHOD, CONTROLLED DEVICE ACCESS METHOD, CONTROLLED DEVICE, AND USER TERMINAL

(71) Applicant: Tencent Technology (Shenzhen) Company Limited, Shenzhen (CN)

(72) Inventor: Wenying Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 135 days.

(21) Appl. No.: 16/045,492

(22) Filed: Jul. 25, 2018

(65) Prior Publication Data

US 2018/0332049 A1    Nov. 15, 2018

Related U.S. Application Data (63) Continuation-in-part of application No. PCT/CN2017/072957, filed on Feb. 6, 2017.

(30) Foreign Application Priority Data

Feb. 19, 2016 (CN) .......................... 2016 1 0095330

(51) Int. Cl.
*H04L 29/06* (2006.01)
*G06F 21/42* (2013.01)
(Continued)

(52) U.S. Cl.
CPC .......... *H04L 63/107* (2013.01); *G06F 21/36* (2013.01); *G06F 21/42* (2013.01); *G06F 21/44* (2013.01);
(Continued)

(58) Field of Classification Search
CPC ..... H04L 63/107; H04L 67/18; H04L 67/025; H04L 63/08; G06F 21/42; G06F 21/36;
(Continued)

(56) References Cited

U.S. PATENT DOCUMENTS 5,832,210 A * 11/1998 Akiyama ............ H04L 63/0823
713/168
8,256,664 B1 * 9/2012 Balfanz .................. G06F 21/43
235/375

(Continued)

FOREIGN PATENT DOCUMENTS

| CN | 1777101 A | 5/2006 |
| CN | 102185839 A | 9/2011 |

(Continued)

OTHER PUBLICATIONS

Tencent Technology, ISRWO, PCT/CN2017/072957, dated May 3, 2017, 5 pgs.

(Continued)

*Primary Examiner* — Darren B Schwartz
(74) *Attorney, Agent, or Firm* — Morgan, Lewis & Bockius LLP (57) ABSTRACT

A controlled device dynamically generates a first security code and broadcasts the first security code repeatedly within a predefined time window. A mobile terminal detects the first security code and submits it and a user account identifier associated with the mobile terminal to a remote server, which then forwards them to the controlled device in the form of a second security code and a user account identifier. The controlled device checks whether the second security code is consistent with the first security code. After determining that the second security code is consistent with the first security code, the controlled device performs a predefined operation associated with the user account identifier. The controlled device also reports the user location check (Continued)

result to the remote server such that the remote server uses the geographical location of the controlled device as the current geographical location of the mobile terminal.

17 Claims, 6 Drawing Sheets (51) Int. Cl.
*H04W 12/08* (2009.01)
*G06F 21/36* (2013.01)
*G06K 7/14* (2006.01)
*G06F 21/44* (2013.01)
*H04W 12/00* (2009.01)
*H04L 29/08* (2006.01)
*H04W 12/06* (2009.01)
*H04W 4/021* (2018.01)

(52) U.S. Cl.
CPC .......... *G06K 7/1417* (2013.01); *H04W 12/08* (2013.01); *H04L 63/08* (2013.01); *H04L 67/025* (2013.01); *H04W 12/00503* (2019.01); *H04W 12/06* (2013.01); *H04W 12/0802* (2019.01)

(58) Field of Classification Search
CPC . G06F 21/44; G06K 7/1417; H04W 12/0804; H04W 4/021; H04W 12/08; H04W 12/0802; H04W 12/00503; H04W 12/06
See application file for complete search history.

(56) References Cited

U.S. PATENT DOCUMENTS

| | | | |
|---|---|---|---|
| 8,627,438 B1* | 1/2014 | Bhimanaik | H04L 63/10 726/9 |
| 9,640,001 B1* | 5/2017 | Vazquez | H04L 63/107 |
| 10,057,227 B1* | 8/2018 | Hess | H04L 63/0853 |
| 10,270,774 B1* | 4/2019 | Berman | H04L 63/083 |
| 2006/0039337 A1* | 2/2006 | Hodoshima | H04W 12/0609 370/338 |
| 2011/0219427 A1* | 9/2011 | Hito | G06F 21/00 726/3 |
| 2013/0167208 A1* | 6/2013 | Shi | H04L 63/18 726/5 |
| 2013/0279697 A1* | 10/2013 | Garcia Morchon | H04B 10/116 380/255 |
| 2013/0306721 A1* | 11/2013 | Meng | G06K 19/06037 235/375 |
| 2014/0031011 A1* | 1/2014 | West | G06F 21/44 455/411 |
| 2014/0197232 A1* | 7/2014 | Birkler | H04L 63/08 235/375 |
| 2014/0223525 A1* | 8/2014 | Fadida | H04L 63/083 726/6 |
| 2014/0259159 A1* | 9/2014 | Banga | G06F 21/56 726/22 |
| 2015/0072618 A1* | 3/2015 | Granbery | G06F 21/10 455/41.2 |
| 2015/0302674 A1* | 10/2015 | Kuruba | G07C 9/33 340/5.54 |
| 2015/0312236 A1* | 10/2015 | Ducker | H04L 63/0876 726/4 |
| 2016/0086453 A1* | 3/2016 | Cage | A63F 13/213 463/29 |
| 2016/0234186 A1* | 8/2016 | Leblond | G06Q 50/163 |
| 2018/0254909 A1* | 9/2018 | Hancock | H04L 9/3268 |

FOREIGN PATENT DOCUMENTS

| | | |
|---|---|---|
| CN | 103023917 A | 4/2013 |
| CN | 103686589 A | 3/2014 |
| CN | 104901970 A | 9/2015 |

OTHER PUBLICATIONS

Tencent Technology, IPRP, PCT/CN2017/072957, dated Aug. 21, 2018 4 pgs.

\* cited by examiner

USER LOCATION CHECK METHOD, CONTROLLED DEVICE ACCESS METHOD, CONTROLLED DEVICE, AND USER TERMINAL

PRIORITY CLAIM AND RELATED APPLICATION

This application is a continuation-in-part application of PCT/CN2017/072957, entitled "USER POSITION VERIFICATION METHOD, CONTROLLED DEVICE ACCESS METHOD, CONTROLLED DEVICE AND USER TERMINAL" filed on Feb. 6, 2017, which claims priority to Chinese Patent Application No. 201610095330.2, filed with the State Intellectual Property Office of the People's Republic of China on Feb. 19, 2016, and entitled "USER LOCATION CHECK METHOD AND APPARATUS, AND CONTROLLED DEVICE ACCESS METHOD AND APPARATUS", all of which are incorporated herein by reference in their entirety.

FIELD OF THE TECHNOLOGY

This application relates to the technical field of computer security, and in particular, to a user location check method, a controlled device access method, a controlled device, and a mobile terminal.

BACKGROUND OF THE DISCLOSURE

In some application scenarios, whether a user location is a particular location needs to be checked, and a particular operation is performed if the check succeeds. Currently, a geographical location of a user is mainly obtained by means of location based service (LBS), to check whether the geographical location of the user falls within a particular geographical location range. The check succeeds if the geographical location of the user falls within the geographical location range; and the check fails if it is determined that the user location is out of the geographical location range.

However, a current user location check manner depends on the LBS, requires a terminal to enable a global positioning system (GPS) positioning function and/or a wireless communications network positioning function, and needs to be supported by an LBS server. Consequently, the current user location check manner imposes very high requirements on a hardware environment, and needs to be improved.

SUMMARY

According to embodiments of this application, a user location check method, a controlled device access method, a controlled device, and a mobile terminal are provided.

According to a first aspect of the present application, a user location check method is performed at a controlled device having one or more processors and memory storing a plurality of programs to be executed by the one or more processors, comprising:

dynamically generating a first security code;

broadcasting the dynamically generated first security code repeatedly within a predefined time window;

receiving a second security code and a user account identifier from a remote server, wherein the remote server receives the second security code and the user account identifier from a mobile terminal after the mobile terminal obtains the dynamically generated first security code through broadcasting;

checking whether the received second security code is consistent with the dynamically generated first security code; and in accordance with a determination that the received second security code is consistent with the dynamically generated first security code, determining that a user location check succeeds and performing a predefined operation associated with the user account identifier.

According to a second aspect of the present application, a controlled device for establishing a wireless network connection, the controlled device comprising one or more processors, memory coupled to the one or more processors, and a plurality of programs stored in the memory that, when executed by the one or more processors, cause the mobile terminal to perform the aforementioned user location check method.

According to a third aspect of the present application, a non-transitory computer readable storage medium stores a plurality of programs that, when executed by one or more processors of a controlled device, cause the controlled device to perform the aforementioned user location check method.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application or in the existing technology more clearly, the following briefly describes the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, this application is further described in detail with reference to the accompanying drawings and the embodiments. It should be understood that the specific embodiments described herein are merely intended to explain this application, but are not intended to limit this application.

Figure 1:
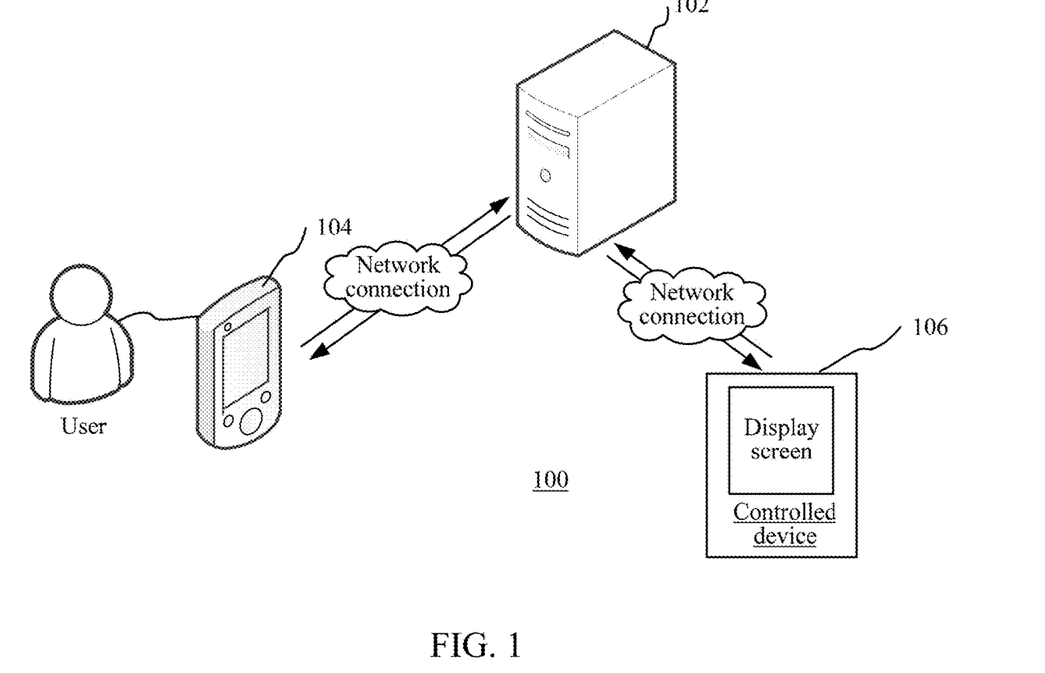
FIG. 1 is a diagram of an application environment of an Internet of Things communications system according to some embodiments of the present application.

As shown in FIG. 1, an embodiment provides an Internet of Things communications system 100, including: an Internet of Things open platform 102, a mobile terminal 104, and a controlled device 106. The Internet of Things open platform 102 in FIG. 1 includes one or more physical servers, is a third-party platform that provides access services for controlled devices 106 of various device suppliers, and provides an interaction interface for the mobile terminal 104. The mobile terminal 104 includes a desktop computer and a mobile terminal. The mobile terminal includes a mobile phone, a tablet computer, a personal digital assistant (PDA), a point of sale (POS), or the like. The controlled device 106 is a device that has a function of connecting to the mobile terminal 104 and that is controlled by the mobile terminal 104, and includes a socket, a network camera, a microphone, an air conditioner, a public courier box, or the like.

Figure 2:
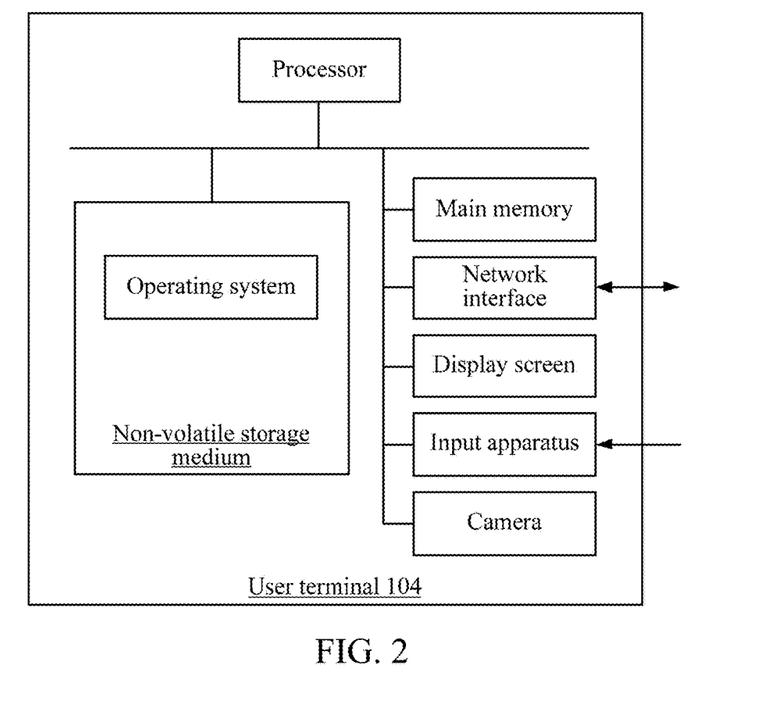
FIG. 2 is a schematic diagram of an inner structure of a mobile terminal according to some embodiments of the present application.

As shown in FIG. 2, an embodiment provides a mobile terminal 104, including: a processor, a non-volatile storage medium, a main memory, a network interface, a display screen, an input apparatus, and a camera that are connected by using a system bus. The processor has a computing function and a function of controlling working of the mobile terminal 104. The processor is configured to perform a controlled device access method. The non-volatile storage medium includes a magnetic storage medium, an optical storage medium, or a flash storage medium. The non-volatile storage medium stores an operating system. The main memory is configured to provide a cache for the operating system. The display screen may be a liquid crystal display screen or an electronic ink display screen. The input apparatus includes a touchpad, a track ball, a mouse, and a touch layer overlapping the display screen, and the display screen and the touch layer form a touchscreen. The network interface is configured to connect to a network.

Figure 3:
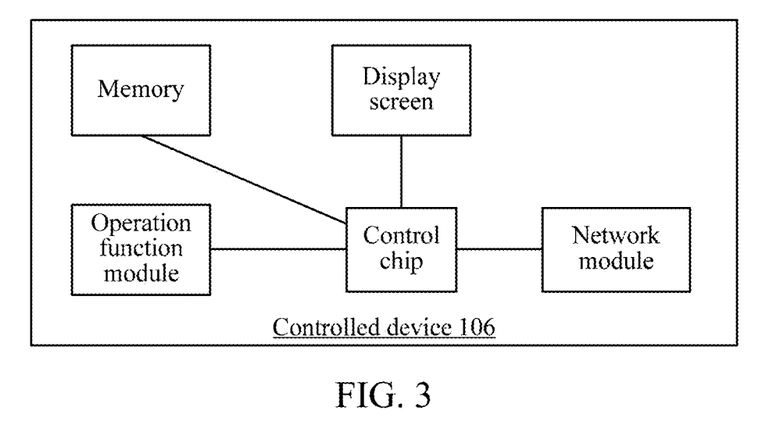
FIG. 3 is a schematic diagram of an inner structure of a controlled device according to some embodiments of the present application.

As shown in FIG. 3, in an embodiment, a controlled device 106 is different from the mobile terminal 104, and includes: a control chip, a wireless connection module, an operation function module, a memory, and a display screen. The controlled device 106 may be connected to the mobile terminal 104 by using the wireless connection module. The wireless connection module includes at least one of a Wi-Fi (a wireless connection technology) module, a Bluetooth module, a subscriber identity module (SIM) card module, and an NFC module. The controlled device 106 may be a network camera, a microphone, a smart television, a printer, a smart lamp, a smart switch, a public courier box, or the like. An operation function module of the network camera at least has a function of capturing an image; and an operation function module of the smart television at least has functions of receiving a television program signal and playing a television program. The rest can be deduced by analogy.

Figure 4:
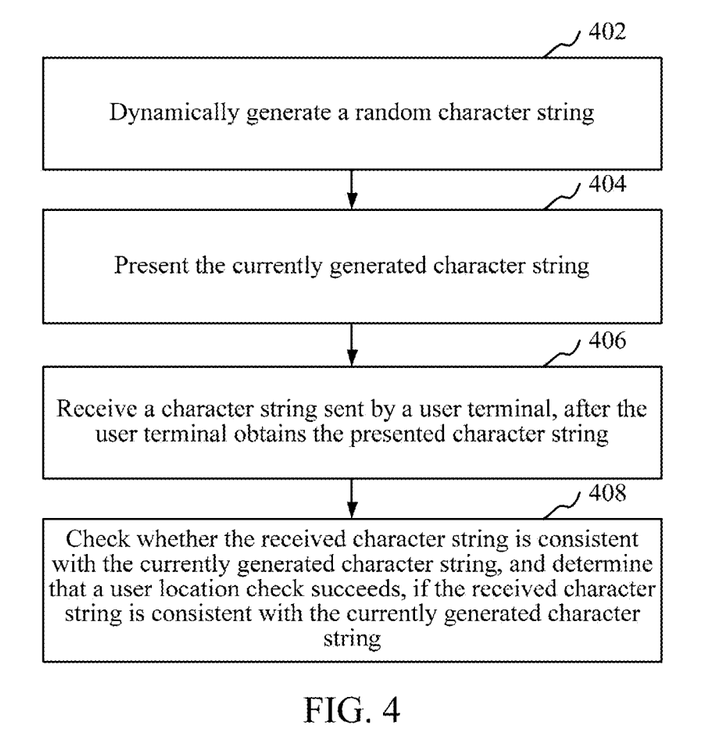
FIG. 4 is a schematic flowchart of a user location check method according to some embodiments of the present application.

As shown in FIG. 4, an embodiment provides a user location check method. This embodiment is described by using an example in which the method is applied to the controlled device 106 shown in FIG. 1 and FIG. 3. The method specifically includes the following steps:

Step 402: Dynamically generate a random character string.

The controlled device dynamically generates the random character string. In this way, the character string is dynamically generated, and the character string generated each time varies. The character string is an ordered combination of one or more characters, and may include one or a combination of more than one of a digit, a letter, a Chinese character, and a punctuation mark. The length of the character string may be set according to requirements. The character string is easier to be broken if the length is shorter, and is more difficult to be memorized by a user if the length is longer. For example, the length of the character string may include three to ten characters.

Specifically, the controlled device may periodically generate a random character string, and the character string generated in this way is a dynamically generated character string. For example, the controlled device may generate a random character string every one minute. A period according to which the controlled device dynamically generates a character string is variable. For example, the period within a peak period in which the controlled device is used may be set to be shorter than the period within an off-peak period in which the controlled device is used.

Step 404: Present the dynamically generated character string.

Specifically, the controlled device may present the currently generated random character string by using a display screen of the controlled device. Specifically, the currently generated random character string is presented in a manner that the character string can be identified by the user or a mobile terminal. For example, the currently generated random character string is directly displayed as the character string itself, or a graphic code is displayed after the graphic code is generated according to the dynamically generated character string.

The graphic code refers to a graphic that may be used to restore an encoded character and that is obtained by encoding a character. The graphic code includes a two-dimensional code and a barcode. The barcode is a graphic identifier that arranges a plurality of black bars and blanks having different widths according to an encoding rule, to express a set of information. A common barcode is a graphic of parallel lines that is formed by black bars and white bars that have significantly different reflectivity. The two-dimensional code is a barcode that records, by using a particular geometric figure and according to a rule, data symbol information on back-and-white checkered figures that are distributed in a planar two-dimensional direction. Two-dimensional codes may be divided into stacked or linear two-dimensional codes and matrix two-dimensional codes. An encoding principle of the stacked or the linear two-dimensional code is based on a one-dimensional barcode, piled into two or more lines as needed. Representative two-dimensional codes are Code 16K, Code 49, PDF 417, and the like. The matrix two-dimensional code implements encoding in a rectangular space according to different distributions of black and white pixels in a matrix. At corresponding pixel locations of the matrix, appearance of a dot (a square dot, a round dot, or a dot in another shape) indicates "1" in a binary system, and disappearance of a dot indicates "0" in the binary system. Meanings represented by the matrix two-dimensional code are determined according to a permutation and a combination of dots. Representative matrix two-dimensional codes are Code One, MaxiCode, or QR Code.

Step 406: Receive a character string sent by a mobile terminal, after the mobile terminal obtains the presented character string.

Specifically, after the mobile terminal obtains the character string presented by the controlled device, a user location check request carrying the obtained character string is sent to the controlled device directly or by using a server. The controlled device receives the user location check request, and obtains the character string from the user location check request.

When the mobile terminal obtains the presented character string, the user may identify the character string presented by the controlled device, to enter the character string to the mobile terminal. In this way, the mobile terminal obtains the character string presented by the controlled device. The mobile terminal may alternatively shoot an image of the character string presented by the controlled device, and identify the character string from the image by means of optical character recognition (OCR). The mobile terminal may alternatively shoot the graphic code presented by the controlled device, to parse out the character string from the graphic code.

Step 408: Check whether the received character string is consistent with the dynamically generated character string, and determine that a user location check succeeds, if the received character string is consistent with the dynamically generated character string.

Specifically, the controlled device may compare the received character string with the dynamically generated character string, to obtain a corresponding user location check result. A check result indicating whether the received character string is consistent with the dynamically generated character string is consistent with the user location check result. The user location check succeeds if the check result indicates that the received character string is consistent with the dynamically generated character string. It indicates that the mobile terminal falls within a visible distance range of the controlled device. That is, a user location is nearby a location of the controlled device. The user location check fails if the check result indicates that the received character string is inconsistent with the dynamically generated character string. It indicates that whether the mobile terminal falls within the visible distance range of the controlled device cannot be determined. That is, whether the user location is nearby the location of the controlled device cannot be determined.

The controlled device may send the user location check result to the server after the user location check result indicating whether the user location check succeeds or the location check fails is obtained, to notify the server of the corresponding user location check result. The server performs a corresponding action according to the user location check result after receiving the user location check result. The server may be an Internet of Things open platform.

According to the user location check method, the random character string is dynamically generated and is presented. If the presented character string obtained by the mobile terminal is received and the received character string is consistent with the dynamically generated character string, it indicates that the mobile terminal falls within a visible range of the presented character string, and it may be determined that the mobile terminal is nearby a device that generates and presents the character string, so as to determine that the user location is nearby a location of the device that generates and presents the character string. In this case, the user location check succeeds. A check process does not depend on an LBS, and does not require the mobile terminal to enable a GPS positioning function and/or a wireless communications network positioning function, having relatively low requirements on a hardware environment. Therefore, the user location check method is applicable to a user location check scenario in which on-site user participation is required.

In an embodiment, step 404 includes: generating a graphic code according to the dynamically generated character string; and presenting the graphic code. Step 406 includes: receiving the character string that is parsed out from the graphic code and that is sent by the mobile terminal, after the mobile terminal obtains the displayed graphic code.

Specifically, the controlled device may encode the dynamically generated character string into the graphic code, and displays the graphic code by using the display screen of the controlled device. The mobile terminal may shoot, by using a camera of the mobile terminal, the graphic code presented by the controlled device, so as to parse out the character string from the graphic code and send the parsed out character string to the controlled device directly or by using the server. When parsing the graphic code, specifically, the mobile terminal may directly parse the graphic code at the local of the mobile terminal, or may send the graphic code to the server for parsing, and receive a character string that is returned by the server after the parsing is completed.

If the controlled device directly presents the character string, the user needs to identify and memorize the character string, and to input the character string into the mobile terminal. In this way, the user needs to participate in a few operations, and the length of the character string is greatly limited. However, if the character string is presented in a form of the graphic code, the user only needs to scan the graphic code by using the mobile terminal, so that the user participates in fewer operations. This is more convenient. Moreover, presenting the character string in the form of the graphic code has fewer limitations on the length of the character string, provided that the character string can be contained by the graphic code. A relatively long character string may be generated to increase the security.

In an embodiment, step 404 includes: generating a graphic code according to the dynamically generated character string and a link address for accessing the controlled device; and presenting the graphic code. Step 406 includes: receiving, after the mobile terminal obtains the displayed graphic code and parses out the character string and the link address from the graphic code, a character string that is forwarded by the server according to the link address after the mobile terminal sends the character string and the link address to the server.

The link address is a link address for accessing the controlled device, and may be an IP address or a domain name address. Specifically, the controlled device may read the link address from the local of the controlled device, or may query for the corresponding link address from the server according to a unique identifier of the controlled device. The server may be an Internet of Things open platform.

Specifically, the controlled device may encode the link address and the character string into a graphic code after connecting the link address and the character string by using an identifiable particular character. Alternatively, the controlled device may add the character string as an access parameter to the link address, and then encode a link address to which the character string serving as the access parameter is added, to generate the graphic code. The controlled device displays the graphic code by using the display screen of the controlled device after generating the graphic code.

The mobile terminal shoots, by using the camera of the mobile terminal, an image of the graphic code presented on the controlled device, and identifies the graphic code from the shot image, so as to parse out encoded content from the graphic code. The encoded content includes the link address and the character string.

If the graphic code is generated by the controlled device by encoding the link address and the character string after the controlled device connects the link address and the character string by using the identifiable particular character, the mobile terminal may obtain the link address and the character string from the encoded content by using the identifiable particular character after parsing out the encoded content, and send the link address and character string to the server. The server sends, after receiving the link address and character string, the character string to the controlled device corresponding to the link address. The server may further directly feedback a device access page corresponding to the link address to the mobile terminal.

If the graphic code is generated by the controlled device by encoding the link address to which the character string serving as the access parameter is added, the encoded content parsed out by the mobile terminal is the link address to which the character string serving as the access parameter is added, so that the link address to which the character string serving as the access parameter is added is sent to the server. The server sends, after receiving the link address to which the character string serving as the access parameter is added, the character string serving as the access parameter to the controlled device corresponding to the link address. The server may further directly feedback the device access page corresponding to the link address to the mobile terminal.

In this embodiment, the graphic code is generated according to the character string and the link address for accessing the controlled device. The mobile terminal does not need to enter, in advance, a page for accessing the controlled device and enter the character string, but may directly scan the graphic code to learn the controlled device that needs to be accessed and the character string required for checking the user location, further reducing operation steps for the user, and improving convenience of the user location check.

In an embodiment, the user location check method further includes: notifying a server if the received character string is consistent with the dynamically generated character string, so that the server returns a device access page corresponding to the link address to the mobile terminal. In this embodiment, the mobile terminal may directly perform a user location check by scanning the graphic code, and may obtain the device access page corresponding to the link address after the user location check is completed, further improving convenience of the operation.

In an embodiment, the user location check method is applied to a controlled device configured as a public device, and the method further includes: notifying a server if the received character string is consistent with the dynamically generated character string, so that the server grants, to the mobile terminal when finding a user account identifier used by the mobile terminal for login has temporary access permission to access the controlled device, permission to access the controlled device.

The controlled device has an attribute of a device type that includes a private device and a public device. Access permission to the corresponding controlled device may be limited according to the attribute of the device type. The controlled device configured as a type of public device is referred to as a public device, and may be accessed by the public.

That the user account identifier has the temporary access permission to access the controlled device means that the access permission of the user account identifier for the controlled device is temporarily granted and may be revoked. For example, the temporary access permission is granted or revoked when a particular event occurs. For another example, the temporary access permission is granted or revoked according to an instruction of the owner of the controlled device. When the user account identifier used by the mobile terminal to log in to the server has the temporary access permission to access the controlled device, the mobile terminal is granted permission to access the controlled device. If the temporary access permission of the user account identifier is revoked, the permission of the mobile terminal to access the controlled device is also revoked.

For example, a public courier box is a controlled device configured as a public device. When the server stores information, indicating that a courier has not been taken out from the controlled device, which corresponds to the user account identifier, the user account identifier is granted temporary permission to access the controlled device. When the user location check succeeds and the user account identifier has the temporary access permission to access the controlled device, the mobile terminal is granted the permission to access the controlled device. When the information on the server, indicating that a courier has not been taken out from the controlled device, which corresponds to the user account identifier is changed to information indicating that the courier has been taken out, the temporary access permission of the user account identifier to access the controlled device is revoked, and the permission of the mobile terminal to access the controlled device is revoked.

In this embodiment, when the user location check succeeds, and the user account identifier used by the mobile terminal for login has the temporary access permission to access the controlled device, the mobile terminal is granted the permission to access the controlled device, so that the mobile terminal may interact with the controlled device by using the device access page corresponding to the link address, for example, open a door of the public courier box, or control a public printer to start printing a file. The interaction between the mobile terminal and the controlled device may be performed when the user location is nearby the location of the controlled device, improving the security when the user controls the controlled device by using the mobile terminal.

In an embodiment, the user location check method further includes: notifying a server if the received character string is consistent with the dynamically generated character string, so that the server obtains a geographical location of a controlled device that generates and displays the character string, and records the geographical location as a geographical location of the mobile terminal.

Specifically, the geographical location of the controlled device may be obtained by the server. The geographical location of the controlled device may be initiatively reported by the controlled device to the server, or may be initiatively entered on the server by the owner of the controlled device. The controlled device notifies the server after the user location check is completed and the user location check succeeds. The server obtains the geographical location of the controlled device that generates and presents the character string, and records the obtained geographical location as the geographical location of the mobile terminal. The server may further set a validity period of the recorded geographical location while recording. If the time exceeds the validity period, the server may delete the recorded geographical location. After recording the geographical location of the mobile terminal, the server may provide various services that are based on the geographical location for the mobile terminal according to the geographical location of the mobile terminal, for example, push information related to the geographical location.

In this embodiment, when the user location check succeeds, it indicates that a location of the mobile terminal is nearby the location of the device that generates and presents the character string. In this way, the server may roughly record the geographical location of the device as the geographical location of the mobile terminal, without requiring the mobile terminal to enable the GPS positioning function and/or the wireless communications network positioning function, providing a new method for mobile terminal positioning.

Figure 5:
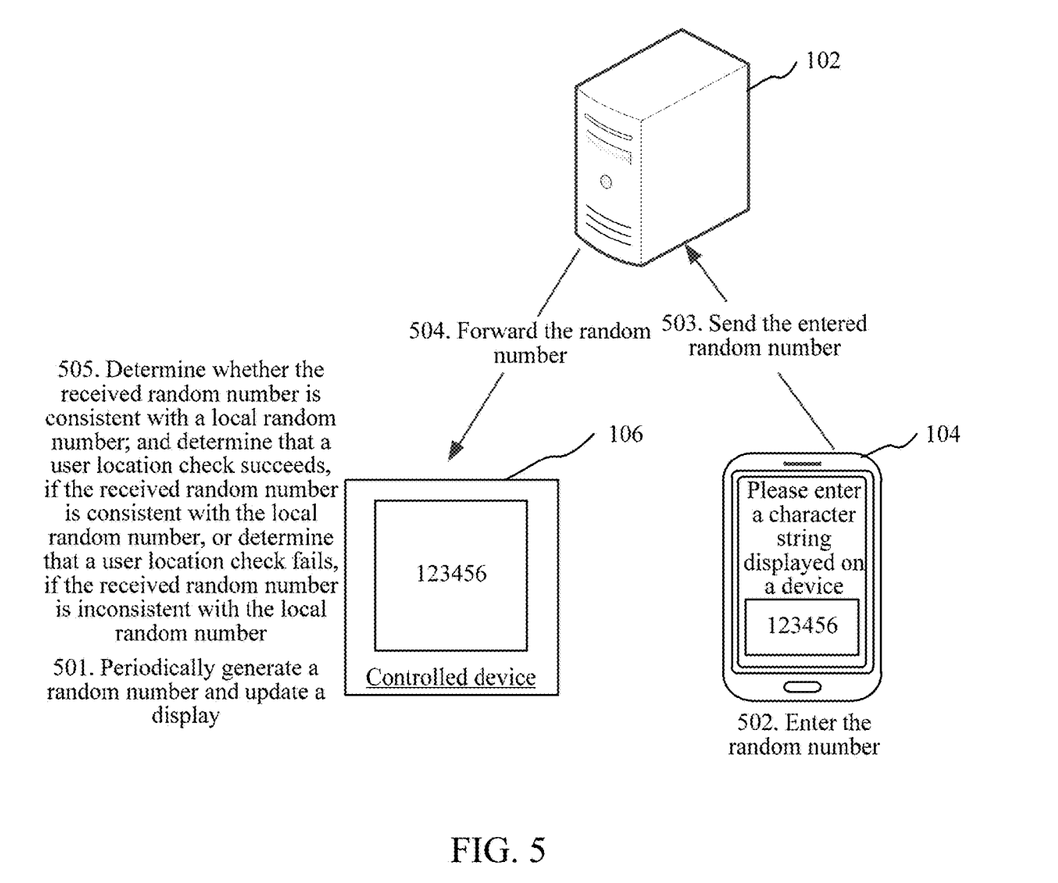
FIG. 5 is a schematic flowchart of a user location check method in a specific application scenario according to some embodiments of the present application.

A principle of the foregoing user location check method is described below by using a specific application scenario. As shown in FIG. 5, the user location check method specifically includes the following steps: Step 501: A controlled device periodically generates and broadcasts a random number, e.g., using a near-field communication and updates a displayed random number after a predefined time window. Step 502: A mobile terminal accesses a page of a controlled device by using a social application that runs on the mobile terminal; and a user identifies the random number from a display screen of the controlled device, and enters the random number into the page accessed by the mobile terminal. Step 503: The mobile terminal transfers the entered random number to an Internet of Things open platform. Step 504: The Internet of Things open platform forwards the random number from the mobile terminal to the controlled device. Step 505: The controlled device determines whether the received random number is consistent with a random number in a current update period; and determines that the user location check succeeds, if the received random number is consistent with the random number in the current update period, or determines that the user location check fails, if the received random number is inconsistent with the random number in the current update period. If the user location check succeeds, the controlled device performs an operation that is allowed when a user location is nearby a location of the controlled device, for example, opening a door of a public courier box, or starting printing a file.

Figure 6:
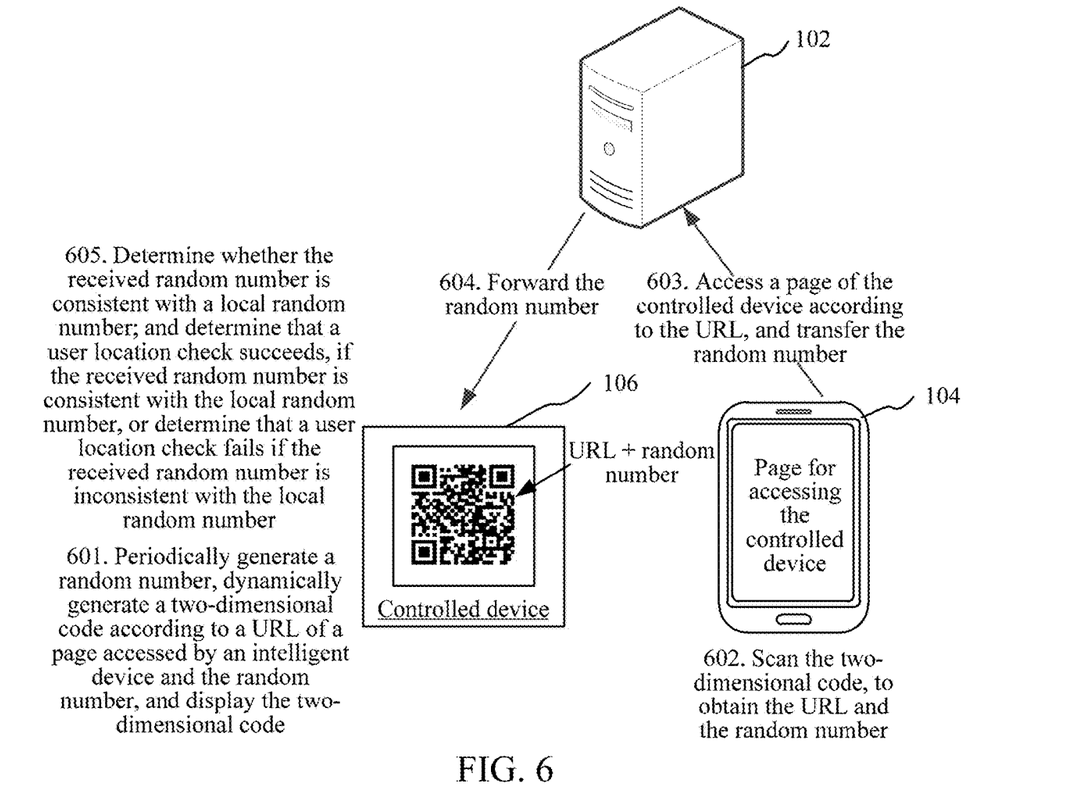
FIG. 6 is a schematic flowchart of a user location check method in another specific application scenario according to some embodiments of the present application.

Certainly, the user needs to perform a plurality of character input operations to enter the random number. This may be further improved. As shown in FIG. 6, Step 601: The controlled device periodically generates a random number, dynamically generates a two-dimensional code according to a uniform resource locator (URL) of a device access page for accessing the controlled device and the generated random number, and displays or broadcasts the two-dimensional code, e.g., using a near-field communication for a predefined time window. Step 602: The mobile terminal scans the two-dimensional code displayed by the controlled device, and parses out the URL and the random number. Step 603: The mobile terminal accesses the device access page of the controlled device according to the URL, and transfers the random number to the Internet of Things open platform. Step 604: The Internet of Things open platform forwards the random number from the mobile terminal to the controlled device. Step 605: The controlled device determines whether the received random number is consistent with a random number in a current update period; and determines that the user location check succeeds, if the received random number is consistent with the random number in the current update period, or determines that the user location check fails, if the received random number is inconsistent with the random number in the current update period.

Figure 7:
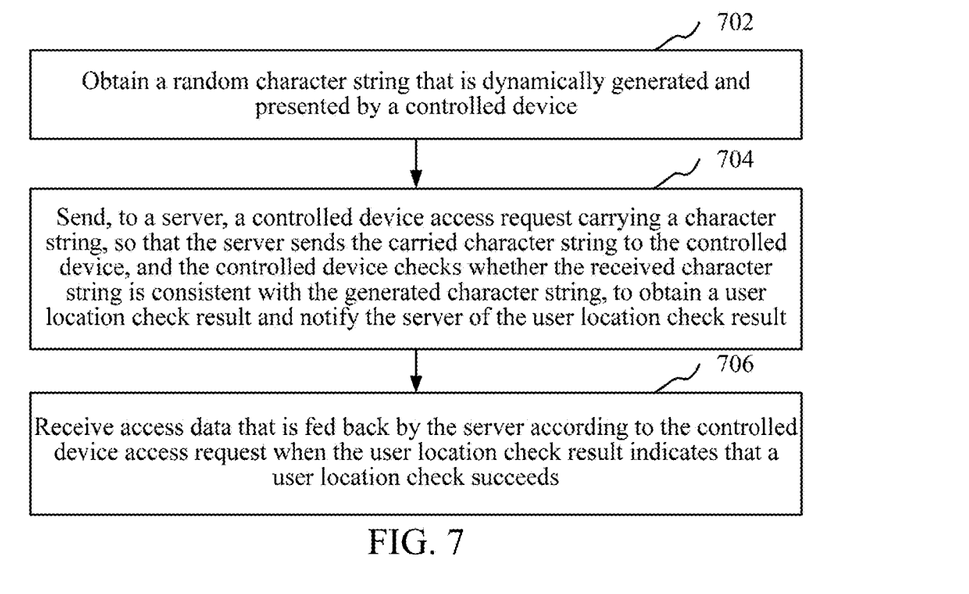
FIG. 7 is a schematic flowchart of a controlled device access method according to some embodiments of the present application.

As shown in FIG. 7, an embodiment provides a controlled device access method. This embodiment is described by using an example in which the method is applied to the mobile terminal 104 shown in FIG. 1 and FIG. 2. The method specifically includes the following steps:

Step 702: Obtain a random character string that is dynamically generated and presented by a controlled device.

Specifically, the controlled device dynamically generates the random character string. In this way, the character string is dynamically generated, and the character string generated each time varies. The character string is an ordered combination of one or more characters, and may include one or a combination of more than one of a digit, a letter, a Chinese character, and a punctuation mark. The length of the character string may be set according to requirements. The character string is easier to be broken if the length is shorter, and is more difficult to be memorized by a user if the length is longer. For example, the length of the character string may include three to ten characters.

Specifically, the controlled device may periodically generate a random character string, and the character string generated in this way is a dynamically generated character string. For example, the controlled device may generate a random character string every one minute. A period according to which the controlled device dynamically generates a character string is variable. For example, the period within a peak period in which the controlled device is used may be set to be shorter than the period within an off-peak period in which the controlled device is used.

The controlled device may present the currently generated random character string by using a display screen of the controlled device. Specifically, the currently generated random character string is presented in a manner that the character string can be identified by the user or the mobile terminal. For example, the currently generated random character string is directly displayed as the character string itself, or a graphic code is displayed after the graphic code is generated according to the dynamically generated character string.

When the mobile terminal obtains the presented character string, the user may identify the character string presented by the controlled device, to enter the character string to the mobile terminal. In this way, the mobile terminal obtains the character string presented by the controlled device. The mobile terminal may alternatively shoot an image of the character string presented by the controlled device, and identify the character string from the image by means of OCR. The mobile terminal may alternatively shoot the graphic code presented by the controlled device, to parse out the character string from the graphic code.

Step 704: Send, to a server, a controlled device access request carrying a character string, so that the server sends the carried character string to the controlled device, and the controlled device checks whether the received character string is consistent with the generated character string, to obtain a user location check result and notify the server of the user location check result. In some embodiments, the controlled device access request also includes a user account identifier associated with the mobile terminal 104.

The controlled device may compare the received character string with the dynamically generated character string, to obtain a corresponding user location check result. A check result indicating whether the received character string is consistent with the dynamically generated character string is consistent with the user location check result. The user location check succeeds if the check result indicates that the received character string is consistent with the dynamically generated character string. It indicates that the mobile terminal falls within a visible distance range of the controlled device. That is, a user location is nearby a location of the controlled device. The user location check fails if the check result indicates that the received character string is inconsistent with the dynamically generated character string. It indicates that whether the mobile terminal falls within the visible distance range of the controlled device cannot be determined. That is, whether the user location is nearby the location of the controlled device cannot be determined.

The controlled device may send the user location check result to the server after the user location check result indicating whether the user location check succeeds or the location check fails is obtained, to notify the server of the corresponding user location check result. The server performs a corresponding action according to the user location check result after receiving the user location check result.

Step 706: Receive access data that is returned by the server according to the controlled device access request when the user location check result indicates that a user location check succeeds.

Specifically, the server returns the access data requested by the controlled device access request to the mobile terminal when the check result indicates that the received character string is consistent with the dynamically generated character string. If the check result indicates that the received character string is inconsistent with the dynamically generated character string, the server may feedback, to the mobile terminal, prompt information indicating that there is an access failure.

According to the controlled device access method, the controlled device dynamically generates and presents the random character string. After obtaining the presented character string, the mobile terminal initiates, to the server, the controlled device access request carrying the character string. The server transfers the carried character string to the controlled device. The controlled device checks whether the received character string is consistent with the generated character string. If the received character string is consistent with the generated character string, it indicates that the mobile terminal falls within a visible range of the presented character string, and it may be determined that the mobile terminal is nearby the controlled device, so as to determine that the user location is nearby a location of the controlled device. In this case, the user location check succeeds, and the server allows the access data requested by the controlled device access request. A check process does not depend on an LBS, and does not require the mobile terminal to enable a GPS positioning function and/or a wireless communications network positioning function, having relatively low requirements on a hardware environment. Therefore, the controlled device access method is applicable to an application scenario in which the user needs to access the controlled device on site nearby the controlled device.

In an embodiment, step 702 specifically includes: obtaining a graphic code that is generated and presented by the controlled device according to the character string after the controlled device dynamically generates the random character string; and parsing the graphic code, to obtain the character string.

Specifically, the controlled device may encode the dynamically generated character string into the graphic code, and displays the graphic code by using the display screen of the controlled device. The mobile terminal may shoot, by using a camera of the mobile terminal, the graphic code presented by the controlled device, so as to parse out the character string from the graphic code and send the parsed out character string to the controlled device directly or by using the server. When parsing the graphic code, specifically, the mobile terminal may directly parse the graphic code at the local of the mobile terminal, or may send the graphic code to the server for parsing, and receive a character string that is returned by the server after the parsing is completed.

If the controlled device directly presents the character string, the user needs to identify and memorize the character string, and to input the character string into the mobile terminal. In this way, the user needs to participate in a few operations, and the length of the character string is greatly limited. However, if the character string is presented in a form of the graphic code, the user only needs to scan the graphic code by using the mobile terminal, so that the user participates in fewer operations. This is more convenient. Moreover, presenting the character string in the form of the graphic code has fewer limitations on the length of the character string, provided that the character string can be contained by the graphic code. A relatively long character string may be generated to increase the security.

In an embodiment, step 702 includes: obtaining a graphic code that is dynamically generated and presented by the controlled device, where the graphic code is generated according to the dynamically generated random character string and a link address for accessing the controlled device; and parsing the graphic code, to obtain the character string and the link address. Step 704 includes: sending, to the server, a controlled device access request carrying a character string and the link address, so that the server sends the carried character string to the controlled device corresponding to the link address, and the controlled device checks whether the received character string is consistent with the generated character string, to obtain the user location check result and notify the server of the user location check result.

The link address is a link address for accessing the controlled device, and may be an IP address or a domain name address. Specifically, the controlled device may read the link address from the local of the controlled device, or may query for the corresponding link address from the server according to a unique identifier of the controlled device.

Specifically, the controlled device may encode the link address and the character string into a graphic code after connecting the link address and the character string by using an identifiable particular character. Alternatively, the controlled device may add the character string as an access parameter to the link address, and then encode a link address to which the character string serving as the access parameter is added, to generate the graphic code. The controlled device displays the graphic code by using the display screen of the controlled device after generating the graphic code.

The mobile terminal shoots, by using the camera of the mobile terminal, an image of the graphic code presented on the controlled device, and identifies the graphic code from the shot image, so as to parse out encoded content from the graphic code. The encoded content includes the link address and the character string.

If the graphic code is generated by the controlled device by encoding the link address and the character string after the controlled device connects the link address and the character string by using the identifiable particular character, the mobile terminal may obtain the link address and the character string from the encoded content by using the identifiable particular character after parsing out the encoded content, and send the link address and character string to the server. The server sends, after receiving the link address and character string, the character string to the controlled device corresponding to the link address. The server may further directly feedback a device access page corresponding to the link address to the mobile terminal.

If the graphic code is generated by the controlled device by encoding the link address to which the character string serving as the access parameter is added, the encoded content parsed out by the mobile terminal is the link address to which the character string serving as the access parameter is added, so that the link address to which the character string serving as the access parameter is added is sent to the server. The server sends, after receiving the link address to which the character string serving as the access parameter is added, the character string serving as the access parameter to the controlled device corresponding to the link address. The server may further directly feedback the device access page corresponding to the link address to the mobile terminal.

In this embodiment, the graphic code is generated according to the character string and the link address for accessing the controlled device. The mobile terminal does not need to enter, in advance, a page for accessing the controlled device and enter the character string, but may directly scan the graphic code to learn the controlled device that needs to be accessed and the character string required for checking the user location, further reducing operation steps for the user, and improving convenience of the user location check.

In an embodiment, the controlled device access method is applied to the mobile terminal. The controlled device is configured as a public device. Step 706 includes: receiving the access data that is returned by the server according to the controlled device access request, where the access data is returned by the server when the check result indicates that the user location check succeeds and the server finds that a user account identifier used by the mobile terminal for login has temporary access permission to access the controlled device.

The controlled device has an attribute of a device type that includes a private device and a public device. Access permission to the corresponding controlled device may be limited according to the attribute of the device type. A controlled device configured as a type of public device is referred to as a public device, and may be accessed by the public.

That the user account identifier has the temporary access permission to access the controlled device means that the access permission of the user account identifier for the controlled device is temporarily granted and may be revoked. For example, the temporary access permission is granted or revoked when a particular event occurs. For another example, the temporary access permission is granted or revoked according to an instruction of the owner of the controlled device. When the user account identifier used by the mobile terminal to log in to the server has the temporary access permission to access the controlled device, the mobile terminal is granted permission to access the controlled device. If the temporary access permission of the user account identifier is revoked, the permission of the mobile terminal to access the controlled device is also revoked.

For example, a public courier box is a controlled device configured as a public device. When the server stores information, indicating that a courier has not been taken out from the controlled device, which corresponds to the user account identifier, the user account identifier is granted temporary permission to access the controlled device. When the user location check succeeds and the user account identifier has the temporary access permission to access the controlled device, the mobile terminal is granted the permission to access the controlled device. When the information on the server, indicating that a courier is not taken out from the controlled device, which corresponds to the user account identifier is changed to information indicating that the courier has been taken out, the temporary access permission of the user account identifier to access the controlled device is revoked, and the permission of the mobile terminal to access the controlled device is revoked.

In this embodiment, when the user location check succeeds, and the user account identifier used by the mobile terminal for login has the temporary access permission to access the controlled device, the mobile terminal is granted the permission to access the controlled device, so that the mobile terminal may interact with the controlled device by using the device access page corresponding to the link address, for example, open a door of the public courier box, or control a public printer to start printing a file. The interaction between the mobile terminal and the controlled device may be performed when the user location is nearby the location of the controlled device, improving the security when the user controls the controlled device by using the mobile terminal.

Figure 8:
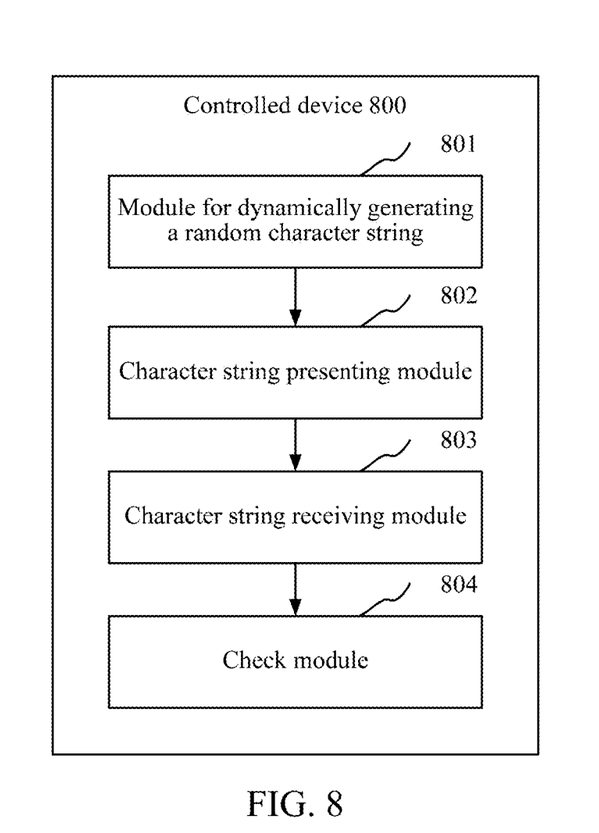
FIG. 8 is a structural block diagram of a controlled device according to some embodiments of the present application.

As shown in FIG. 8, an embodiment provides a controlled device 800. An inner structure of the controlled device 800 may correspond to the structure shown in FIG. 3. All or some of the modules described below may be implemented by software, hardware, or a combination thereof. The controlled device 800 includes: a module 801 for dynamically generating a random character string, a character string presenting module 802, a character string receiving module 803, and a check module 804.

The module 801 for dynamically generating a random character string is configured to dynamically generate a random character string.

The character string presenting module 802 is configured to present the dynamically generated character string.

The character string receiving module 803 is configured to receive a character string sent by a mobile terminal, after the mobile terminal obtains the presented character string.

The check module 804 is configured to: check whether the received character string is consistent with the dynamically generated character string, and determine that a user location check succeeds, if the received character string is consistent with the dynamically generated character string.

The controlled device 800 dynamically generates and presents the random character string. If the presented character string obtained by the mobile terminal is received and the received character string is consistent with the dynamically generated character string, it indicates that the mobile terminal falls within a visible range of the presented character string, and it may be determined that the mobile terminal is nearby a device that generates and presents the character string, so as to determine that the user location is nearby a location of the device that generates and presents the character string. In this case, the user location check succeeds. A check process does not depend on an LBS, and does not require the mobile terminal to enable a GPS positioning function and/or a wireless communications network positioning function, having relatively low requirements on a hardware environment. Therefore, the controlled device is applicable to a user location check scenario in which on-site user participation is required.

Figure 9:
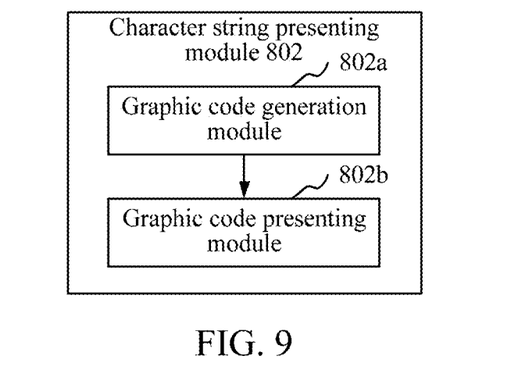
FIG. 9 is a structural block diagram of a character string presenting module according to some embodiments of the present application.

As shown in FIG. 9, in an embodiment, the character string presenting module 802 includes a graphic code generation module 802a and a graphic code presenting module 802b.

The graphic code generation module 802a is configured to generate a graphic code according to the dynamically generated character string.

The graphic code presenting module 802b is configured to present the graphic code.

The character string receiving module 803 is further configured to receive, after the mobile terminal obtains the displayed graphic code, the character string that is parsed out from the graphic code and that is sent by the mobile terminal.

In this embodiment, if the controlled device directly presents the character string, a user needs to identify and memorize the character string, and to input the character string into the mobile terminal. In this way, the user needs to participate in a few operations, and the length of the character string is greatly limited. However, if the character string is presented in a form of the graphic code, the user only needs to scan the graphic code by using the mobile terminal, so that the user participates in fewer operations. This is more convenient. Moreover, presenting the character string in the form of the graphic code has fewer limitations on the length of the character string, provided that the character string can be contained by the graphic code. A relatively long character string may be generated to increase the security.

In an embodiment, the graphic code generation module 802a is configured to generate a graphic code according to the dynamically generated character string and a link address for accessing the controlled device; and the graphic code presenting module 802b is configured to present the graphic code.

The character string receiving module 803 is further configured to receive, after the mobile terminal obtains the displayed graphic code and parses out the character string and the link address from the graphic code, a character string that is forwarded by a server according to the link address after the mobile terminal sends the character string and the link address to the server.

Figure 10:
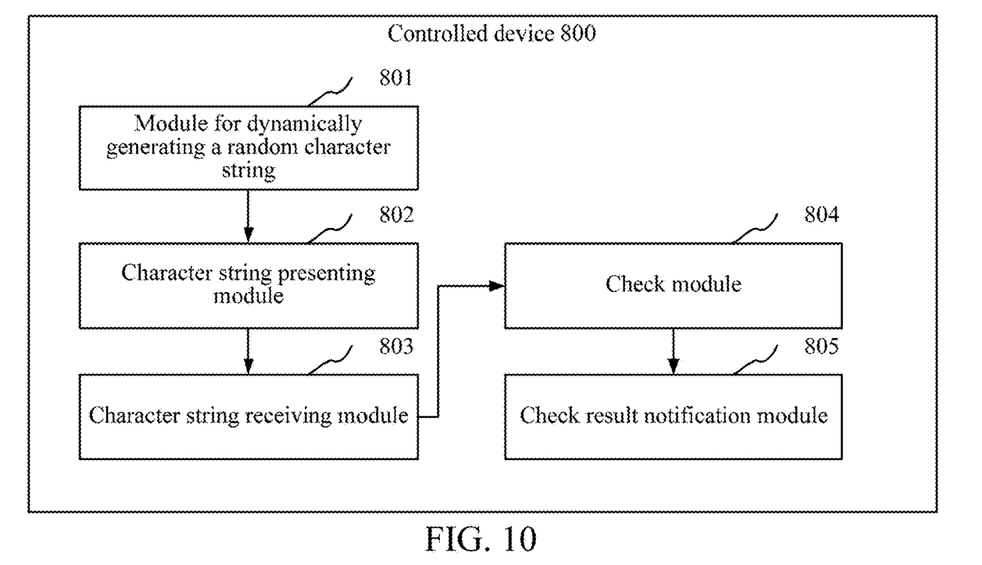
FIG. 10 is a structural block diagram of a controlled device according to another embodiment of the present application.

As shown in FIG. 10, in an embodiment, the controlled device 800 further includes: a check result notification module 805, configured to notify a server if the received character string is consistent with the dynamically generated character string, so that the server returns a device access page corresponding to the link address to the mobile terminal.

In an embodiment, the controlled device is configured as a public device; and the check result notification module 805 is configured to notify a server if the received character string is consistent with the dynamically generated character string, so that the server grants, to the mobile terminal when finding a user account identifier used by the mobile terminal for login has temporary access permission to access the controlled device, permission to access the controlled device.

In an embodiment, the check result notification module 805 is configured to notify a server if the received character string is consistent with the dynamically generated character string, so that the server obtains a geographical location of a controlled device that generates and displays the character string, and records the geographical location as a geographical location of the mobile terminal. In some embodiments, the server returns the recorded geographical location to the mobile terminal such that the mobile terminal knows its current location. This feature is especially valuable if the mobile terminal does not have a GPS module or if the mobile terminal's built-in positioning module is temporarily unavailable or disabled.

Figure 11:
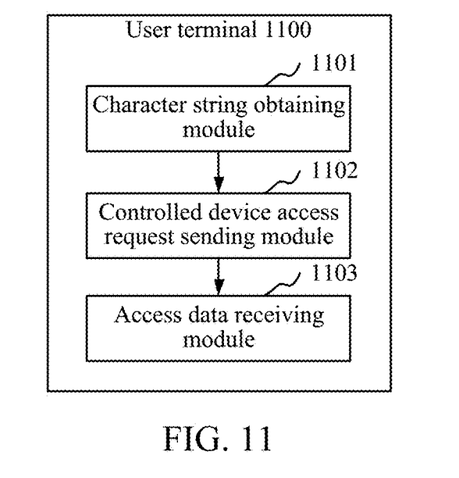
FIG. 11 is a structural block diagram of a mobile terminal according to some embodiments of the present application.

As shown in FIG. 11, an embodiment provides a mobile terminal 1100. An inner structure of the mobile terminal 1100 may correspond to the structure shown in FIG. 2. All or some of the modules described below may be implemented by software, hardware, or a combination thereof. The mobile terminal 1100 includes: a character string obtaining module 1101, a controlled device access request sending module 1102, and an access data receiving module 1103.

The character string obtaining module 1101 is configured to obtain a random character string that is dynamically generated and presented by a controlled device.

The controlled device access request sending module 1102 is configured to send, to a server, a controlled device access request carrying a character string, so that the server sends the carried character string to the controlled device, and the controlled device checks whether the received character string is consistent with the generated character string, to obtain a user location check result and notify the server of the user location check result.

The access data receiving module 1103 is configured to receive access data that is returned by the server according to the controlled device access request when the user location check result indicates that a user location check succeeds.

According to the mobile terminal 1100, the controlled device dynamically generates and presents the random character string. After obtaining the presented character string, the mobile terminal initiates, to the server, the controlled device access request carrying the character string. The server transfers the carried character string to the controlled device. The controlled device checks whether the received character string is consistent with the generated character string. If the received character string is consistent with the generated character string, it indicates that the mobile terminal falls within a visible range of the presented character string, and it may be determined that the mobile terminal is nearby the controlled device, so as to determine that the user location is nearby a location of the controlled device. In this case, the user location check succeeds, and the server allows the access data requested by the controlled device access request. A check process does not depend on an LBS, and does not require the mobile terminal to enable a GPS positioning function and/or a wireless communications network positioning function, having relatively low requirements on a hardware environment. Therefore, the mobile terminal 1100 is applicable to an application scenario in which the user needs to access the controlled device on site nearby the controlled device.

Figure 12:
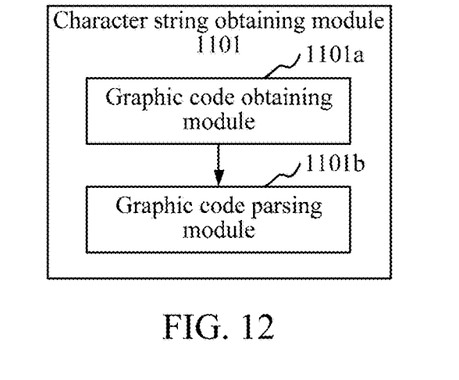
FIG. 12 is a structural block diagram of a character string obtaining module according to some embodiments of the present application.

As shown in FIG. 12, in an embodiment, the character string obtaining module 1101 includes a graphic code obtaining module 1101a and a graphic code parsing module 1101b.

The graphic code obtaining module 1101a is configured to obtain a graphic code that is generated and presented by the controlled device according to the character string after the controlled device dynamically generates the random character string.

The graphic code parsing module 1101b is configured to parse the graphic code, to obtain the character string.

In an embodiment, the graphic code obtaining module 1101a is configured to obtain a graphic code that is dynamically generated and presented by the controlled device, and the graphic code is generated according to the dynamically generated random character string and a link address for accessing the controlled device.

The graphic code parsing module 1101b is configured to parse the graphic code, to obtain the character string and the link address.

The controlled device access request sending module 1102 is further configured to send, to the server, a controlled device access request carrying the character string and the link address, so that the server sends the carried character string to the controlled device corresponding to the link address, and the controlled device checks whether the received character string is consistent with the generated character string, to obtain the user location check result and notify the server of the user location check result.

In this embodiment, the graphic code is generated according to the character string and the link address for accessing the controlled device. The mobile terminal does not need to enter, in advance, a page for accessing the controlled device and enter the character string, but may directly scan the graphic code to learn the controlled device that needs to be accessed and the character string required for checking the user location, further reducing operation steps for the user, and improving convenience of the user location check.

A person of ordinary skill in the art may understand that all or some of the processes of the methods in the foregoing embodiments may be implemented by a computer program instructing relevant hardware. The program may be stored in a computer readable storage medium. When the program runs, the processes of the methods in the embodiments are performed. The storage medium may be a non-volatile storage medium such as a magnetic disk, an optical disc, or a read-only memory (ROM), or may be a random access memory (RAM) or the like.

The technical features of the foregoing embodiments may be randomly combined. For a brief description, not all possible combinations of the technical features in the foregoing embodiments are described. However, the combinations of these technical features should be considered to fall within the scope of this specification as long as the combinations are not contradictory.

The foregoing embodiments only describe several implementations of this application, which are described specifically and in detail, and therefore cannot be construed as a limitation to the patent scope of the present disclosure. It should be noted that a person of ordinary skill in the art may further make several variations and improvements without departing from the conception of this application, and these variations and improvements all fall within the protection scope of this application. Therefore, the patent protection scope of this application should be subject to the appended claims.

What is claimed is:

1. A user location check method performed at a controlled device having one or more processors and memory storing a plurality of programs to be executed by the one or more processors, comprising:

dynamically generating a first security code, wherein the first security code is a randomly generated alphanumerical string including a link address;

periodically broadcasting the dynamically generated first security code repeatedly within a predefined time window;

receiving a second security code and a user account identifier from a remote server, wherein the remote server receives the second security code and the user account identifier from a mobile terminal after the mobile terminal obtains the dynamically generated first security code through the broadcasting and forwards the second security code to the controlled device according to the link address in the dynamically generated first security code;

checking whether the received second security code is consistent with the dynamically generated first security code; and determining that a user location check succeeds only in accordance with a determination that the received second security code is consistent with the dynamically generated first security code and performing a predefined operation associated with the user account identifier.

2. The method according to claim 1, wherein the broadcasting the dynamically generated first security code repeatedly within the predefined time window comprises:

generating a graphic code according to the dynamically generated first security code;

displaying the graphic code; and the receiving the second security code and the user account identifier from the remote server further comprises:

parsing the second security code from the graphic code that is sent by the mobile terminal, after the mobile terminal obtains the displayed graphic code.

3. The method according to claim 1, further comprising:

sending a user location check result to the remote server after the user location check result indicating whether the user location check succeeds or the location check fails is obtained, so that the remote server performs a corresponding action according to the user location check result after receiving the user location check result.

4. The method according to claim 1, further comprising:

notifying the remote server if the received second security code is consistent with the dynamically generated first security code, so that the remote server grants, to the mobile terminal, when finding the user account identifier provided by the mobile terminal for login has temporary access permission to access the controlled device, permission to access the controlled device.

5. The method according to claim 1, further comprising:

notifying the remote server if the received second security code is consistent with the dynamically generated first security code, so that the server obtains a geographical location of the controlled device that generates and displays the dynamically generated first security code, and records the geographical location as a geographical location of the mobile terminal.

6. The method according to claim 1, wherein the dynamically generated first security code is broadcast via a near-field communication channel.

7. A controlled device for establishing a wireless network connection, the controlled device comprising one or more processors, memory coupled to the one or more processors, and a plurality of programs stored in the memory that, when executed by the one or more processors, cause the mobile terminal to perform operations including:
dynamically generating a first security code, wherein the first security code is a randomly generated alphanumerical string including a link address;
periodically broadcasting the dynamically generated first security code repeatedly within a predefined time window;
receiving a second security code and a user account identifier from a remote server, wherein the remote server receives the second security code and the user account identifier from a mobile terminal after the mobile terminal obtains the dynamically generated first security code through the broadcasting and forwards the second security code to the controlled device according to the link address in the dynamically generated first security code;
checking whether the received second security code is consistent with the dynamically generated first security code; and
determining that a user location check succeeds only in accordance with a determination that the received second security code is consistent with the dynamically generated first security code and performing a predefined operation associated with the user account identifier.

8. The controlled device according to claim 7, wherein the broadcasting the dynamically generated first security code repeatedly within the predefined time window comprises:
generating a graphic code according to the dynamically generated first security code;
displaying the graphic code; and
the receiving the second security code and the user account identifier from the remote server further comprises:
parsing the second security code from the graphic code that is sent by the mobile terminal, after the mobile terminal obtains the displayed graphic code.

9. The controlled device according to claim 7, wherein the operations further comprise:
sending a user location check result to the remote server after the user location check result indicating whether the user location check succeeds or the location check fails is obtained, so that the remote server performs a corresponding action according to the user location check result after receiving the user location check result.

10. The controlled device according to claim 7, wherein the operations further comprise:
notifying the remote server if the received second security code is consistent with the dynamically generated first security code, so that the remote server grants, to the mobile terminal, when finding the user account identifier provided by the mobile terminal for login has temporary access permission to access the controlled device, permission to access the controlled device.

11. The controlled device according to claim 7, wherein the operations further comprise:
notifying the remote server if the received second security code is consistent with the dynamically generated first security code, so that the server obtains a geographical location of the controlled device that generates and displays the dynamically generated first security code, and records the geographical location as a geographical location of the mobile terminal.

12. The controlled device according to claim 7, wherein the dynamically generated first security code is broadcast via a near-field communication channel.

13. A non-transitory computer readable storage medium storing a plurality of programs that, when executed by one or more processors of a controlled device, cause the controlled device to perform operations including:
dynamically generating a first security code, wherein the first security code is a randomly generated alphanumerical string including a link address;
periodically broadcasting the dynamically generated first security code repeatedly within a predefined time window;
receiving a second security code and a user account identifier from a remote server, wherein the remote server receives the second security code and the user account identifier from a mobile terminal after the mobile terminal obtains the dynamically generated first security code through the broadcasting and forwards the second security code to the controlled device according to the link address in the dynamically generated first security code;
checking whether the received second security code is consistent with the dynamically generated first security code; and
determining that a user location check succeeds only in accordance with a determination that the received second security code is consistent with the dynamically generated first security code and performing a predefined operation associated with the user account identifier.

14. The non-transitory computer readable storage medium according to claim 13, wherein the broadcasting the dynamically generated first security code repeatedly within the predefined time window comprises:
generating a graphic code according to the dynamically generated first security code;
displaying the graphic code; and
the receiving the second security code and the user account identifier from the remote server further comprises:
parsing the second security code from the graphic code that is sent by the mobile terminal, after the mobile terminal obtains the displayed graphic code.

15. The non-transitory computer readable storage medium according to claim 13, wherein the operations further comprise:
sending a user location check result to the remote server after the user location check result indicating whether the user location check succeeds or the location check fails is obtained, so that the remote server performs a corresponding action according to the user location check result after receiving the user location check result.

16. The non-transitory computer readable storage medium according to claim 13, wherein the operations further comprise:
notifying the remote server if the received second security code is consistent with the dynamically generated first security code, so that the remote server grants, to the mobile terminal, when finding the user account identifier provided by the mobile terminal for login has temporary access permission to access the controlled device, permission to access the controlled device.

17. The non-transitory computer readable storage medium according to claim 13, wherein the operations further comprise:

notifying the remote server if the received second security code is consistent with the dynamically generated first security code, so that the server obtains a geographical location of the controlled device that generates and displays the dynamically generated first security code, and records the geographical location as a geographical location of the mobile terminal.

* * * * *